(12) United States Patent
Wang et al.

(10) Patent No.: US 8,385,549 B2
(45) Date of Patent: Feb. 26, 2013

(54) FAST AUTHENTICATION BETWEEN HETEROGENEOUS WIRELESS NETWORKS

(75) Inventors: Jui-Tang Wang, Keelung (TW);
Chi-Chung Chen, Zhubei (TW);
Kuei-Li Huang, Kaohsiung (TW);
Chien-Chao Tseng, Hsinchu (TW);
Cheng-Yuan Ho, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 284 days.

(21) Appl. No.: 12/838,894

(22) Filed: Jul. 19, 2010

(65) Prior Publication Data

US 2011/0047382 A1 Feb. 24, 2011

Related U.S. Application Data

(60) Provisional application No. 61/235,749, filed on Aug. 21, 2009.

(51) Int. Cl.
*H04K 1/00* (2006.01)
*H04L 9/00* (2006.01)
(52) U.S. Cl. ............................. 380/270; 380/44; 713/168
(58) Field of Classification Search .................... 380/44, 380/270, 272, 277, 281, 284; 713/150, 168–171; 726/2–4
See application file for complete search history.

(56) References Cited

U.S. PATENT DOCUMENTS

| | | | | |
|---|---|---|---|---|
| 7,499,547 B2* | 3/2009 | Zheng et al. | .................. | 380/247 |
| 7,602,918 B2* | 10/2009 | Mizikovsky et al. | ......... | 380/270 |
| 8,094,821 B2* | 1/2012 | Hsu | .............................. | 380/270 |

OTHER PUBLICATIONS

Lopez, R.M. et al. "*A Fast and Heterogeneous Handover Architecture based on an extended EAP lower-layer.*" Mobile and Wireless Communications Summit, 2007. 16th IST, *IEEE Xplore*, 2007.

* cited by examiner

*Primary Examiner* — Hosuk Song
(74) *Attorney, Agent, or Firm* — Alston & Bird LLP

(57) ABSTRACT

A method for preparing for handover of an apparatus from a first wireless network to a second, different wireless network, a master session key (MSK) having been generated during establishment of a connectivity of the apparatus to the first wireless network includes detecting signals of the second wireless network. In response thereto, establishing a connectivity of the apparatus to the second wireless network, using a pairwise master key (PMK) derived from the MSK generated during establishment of the connectivity to the first wireless network, one or more encryption keys being derivable from the PMK to support secure communication over the second wireless network.

21 Claims, 13 Drawing Sheets

FAST AUTHENTICATION BETWEEN HETEROGENEOUS WIRELESS NETWORKS

This application claims the benefit of U.S. Provisional Application No. 61/235,749, filed Aug. 21, 2009, the content of which is hereby incorporated by reference in its entirety.

TECHNICAL FIELD

Exemplary embodiments of the disclosure relate to interworking between heterogeneous wireless networks, and more particularly, to a fast authentication between heterogeneous wireless networks.

BACKGROUND

In recent years, wireless communication technologies have become more popular in our daily life. Although all wireless communication technologies provide wireless broadband connectivity, they have been optimized for different coverage and bandwidth limitations. To achieve more broadband services in more places, interworking between heterogeneous wireless networks is desirable. Nevertheless, in today's interworking environment, even when a full authentication has been performed between a mobile station (MS) and an Authentication, Authorization, Accounting (AAA) server in establishment of connectivity to one wireless network, another full authentication is required when the MS decides to handover from this wireless network to a heterogeneous wireless network. Authorization and key exchange procedures, however, are the most time-consuming operation in the network entry process. The redundant operations may therefore waste bandwidth and result in handover latency, which may consequently degrade the performance of a communications system.

FIG. 1 is a message flow of a conventional handover procedure from a WiMAX network (IEEE 802.16) to a WiFi network (IEEE 802.11) based on Extensible Authentication Protocol (EAP) authentication schemes. Establishment of the connectivity of the MS to the WiMAX network prior to being handed off to the WiFi network is illustrated in detail by FIG. 2. As shown in FIG. 2, a first EAP-based full authentication procedure is performed between the MS and an authentication server (e.g., the AAA server) via an appropriate WiMAX base station (BS) and access service network Gateway (ASN-GW). The full EAP-based authentication process includes exchanging of EAP-Req Identity (step S206) and EAP-Resp Identity (step S208) message pairs, and performing EAP-based method (step S210), and concludes with an EAP-Success or EAP-Failure message (step S212). After a successful execution of the EAP-based authentication method, a Master Session Key (MSK) is generated. Both the MS and the AAA server hold and use the MSK to derive other security keys, such as a pairwise master key (PMK), Authorization Key (AK) and Traffic Encryption Key (TEK). A secure wireless connection between the MS and the WiMAX BS may then be established using these security keys.

Referring back to FIG. 1, when the decision is made to handover from the WiMAX network to the WiFi network, a second EAP-based full authentication procedure is performed in the same manner as the first to generate security keys to support a secure connection between the MS and an authenticator in the WiFi network. Similar to the interworking from the WiMAX network to the WiFi network, when the decision is made to handover from the WiFi network to the WiMAX network, a full EAP-based authentication procedure would be similarly executed twice. One procedure would be executed when the MS enters the WiFi Network, and the other procedure would be executed when the MS hands off from the WiFi network to the WiMAX network.

BRIEF SUMMARY

According to one exemplary embodiment of the disclosure, a method for preparing for handover of an apparatus from a first wireless network to a second different wireless network includes detecting signals of the second wireless network and in response thereto, establishing a connectivity of the apparatus to the second wireless network, using a pairwise master key (PMK) derived from a MSK generated during the establishment of the connectivity to the first wireless network, one or more encryption keys being derivable from the PMK to support secure communication over the second wireless network.

According to one exemplary embodiment of the disclosure, an apparatus comprises a processor configured to prepare a handover for the apparatus from a first wireless network to a second, different wireless network, a master session key (MSK) have been generated during establishment of a connectivity of the apparatus to the first wireless network, the processor configured to perform or cause the apparatus to perform detecting signals of the second wireless network and in response thereto, establishing a connectivity of the apparatus to the second wireless network, using a pairwise master key (PMK) derived from a MSK generated during the establishment of the connectivity to the first wireless network, one or more encryption keys being derivable from the PMK to support secure communication over the second wireless network.

According to one exemplary embodiment of the disclosure, a method for preparing for handover of an apparatus from a first wireless network to a second different wireless network includes establishing a connectivity of the apparatus to the second wireless network, using a pairwise master key (PMK) derived from a MSK generated during the establishment of the connectivity of the apparatus to the first wireless network, one or more encryption keys being derivable from the PMK to support secure communication over the second wireless network.

BRIEF DESCRIPTION OF THE DRAWINGS

The embodiments illustrated in the figures of the accompanying drawings herein are by way of example and not by way of limitation. In the drawings.

DETAILED DESCRIPTION

The disclosure now will be described more fully hereinafter with reference to the accompanying drawings, in which preferred embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

It should be further understood that although described herein as WiMAX-WiFi interworking, the principles described herein may be equally applicable to any two heterogeneous wireless networks. The principles applied to mobile stations may additionally or alternatively be applied to mobile users, mobile nodes, mobile subscriber stations, mobile terminals or the like. The base station may include a pico base station, relay station, femto base station or the like to provide access service for mobile stations.

Figure 1:
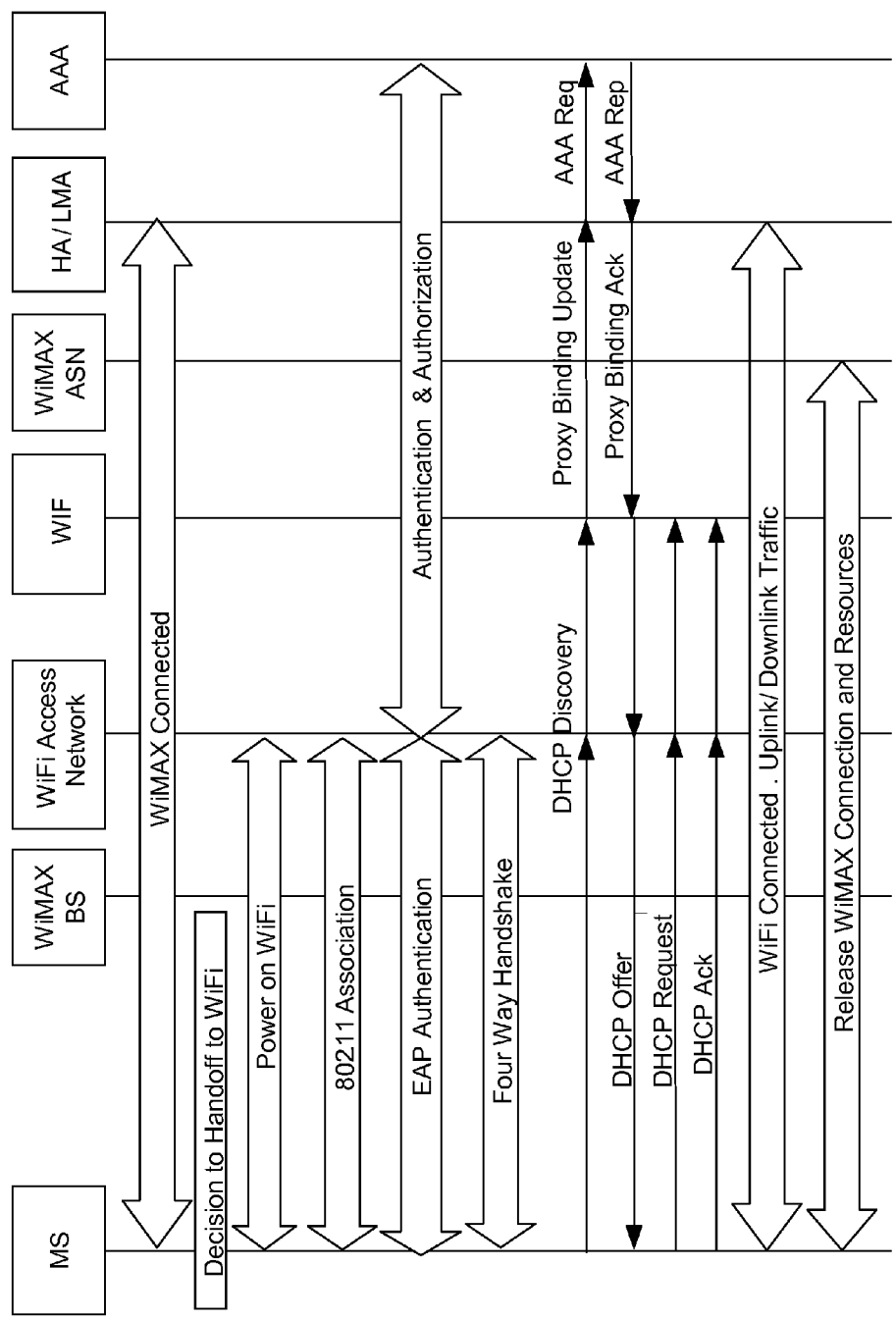
FIG. 1 is a message flow of a conventional handover procedure from a WiMAX network to a WiFi network based on EAP authentication schemes.
Figure 2:
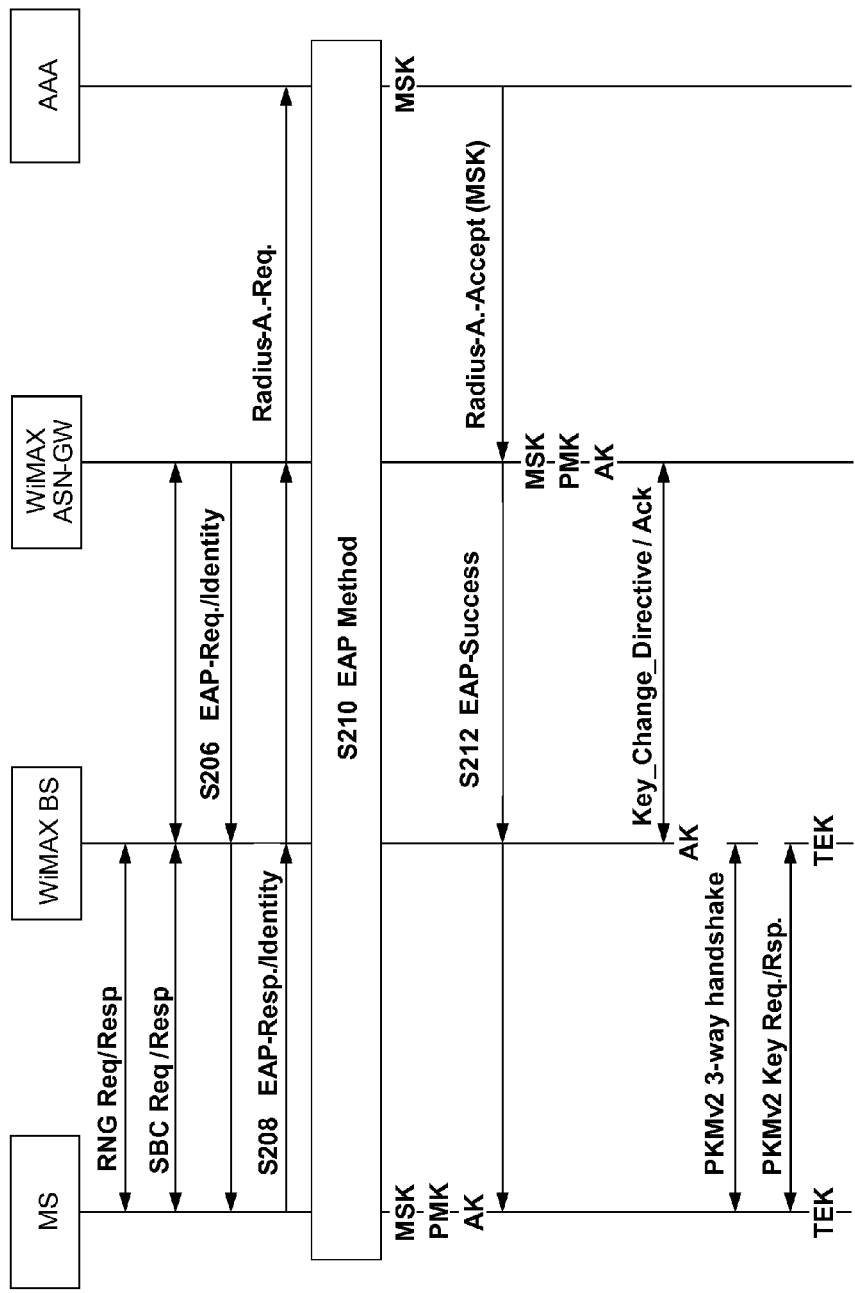
FIG. 2 is an authentication procedure in a WiMAX network according to an exemplary embodiment of the disclosure.
Figure 3:
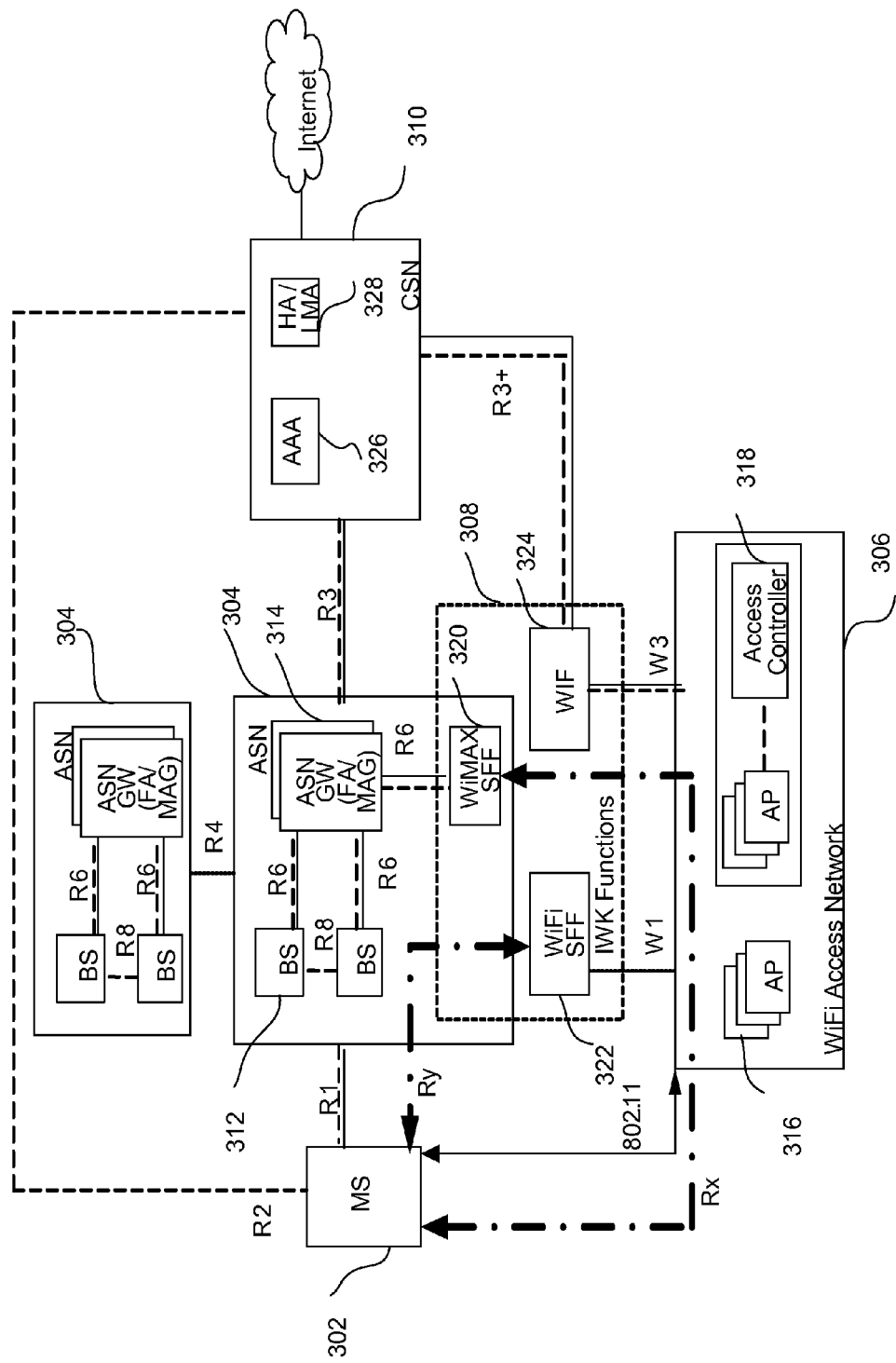
FIG. 3 illustrates a WiMAX-WiFi interworking architecture according to an exemplary embodiment of the disclosure.

FIG. 3 illustrates a WiMAX-WiFi interworking architecture according to one exemplary embodiment of the disclosure ("exemplary" as used herein referring to "serving as an example, instance or illustration"). The WiMAX-WiFi interworking architecture comprises a number of components. The components include a mobile station (MS) 302, WiMAX access service networks (ASNs) 304, a WiFi access network (AN) 306, an interworking (IWK) functions group 308 and a connectivity service network (CSN) 310. Each of the WiMAX ASN 304, the WiFi AN 306 and the CSN 310 may include a network authentication component that may act as an authenticator. The MS 302 may be used by the end users to access the internet via WiMAX network or WiFi network. The WiMAX ASN 304 includes one or more WiMAX base stations (BSs) 312 and one or more access gateways, such as ASN-GWs or foreign agent/mobile access gateway (FA/MAG) 314. The WiMAX ASN 304 may connect to the MS 302 through the BS 312, and may manage handovers of the MS between the base stations. The ASN-GW 314 may be the network authentication component in the WiMAX network and may function as an authenticator in the WiMAX network, and accordingly, may be referred to as a WiMAX authenticator. The WiMAX authenticator may receive authentication messages from the BS 312, encapsulate the authentication messages and send the encapsulated authentication messages to the network authentication component in the CSN 310 that may be accordingly referred to as a core authenticator, e.g., an AAA server 326 in the CSN 310.

The WiFi AN 306 includes an access point (AP) 316 and an access controller (AC) 318. The AP 316 or the AC 318 may be the network authentication component in the WiFi network, thereby acting as the authenticator in the WiFi network, and accordingly, may be referred to as a WiFi authenticator.

Figure 4:
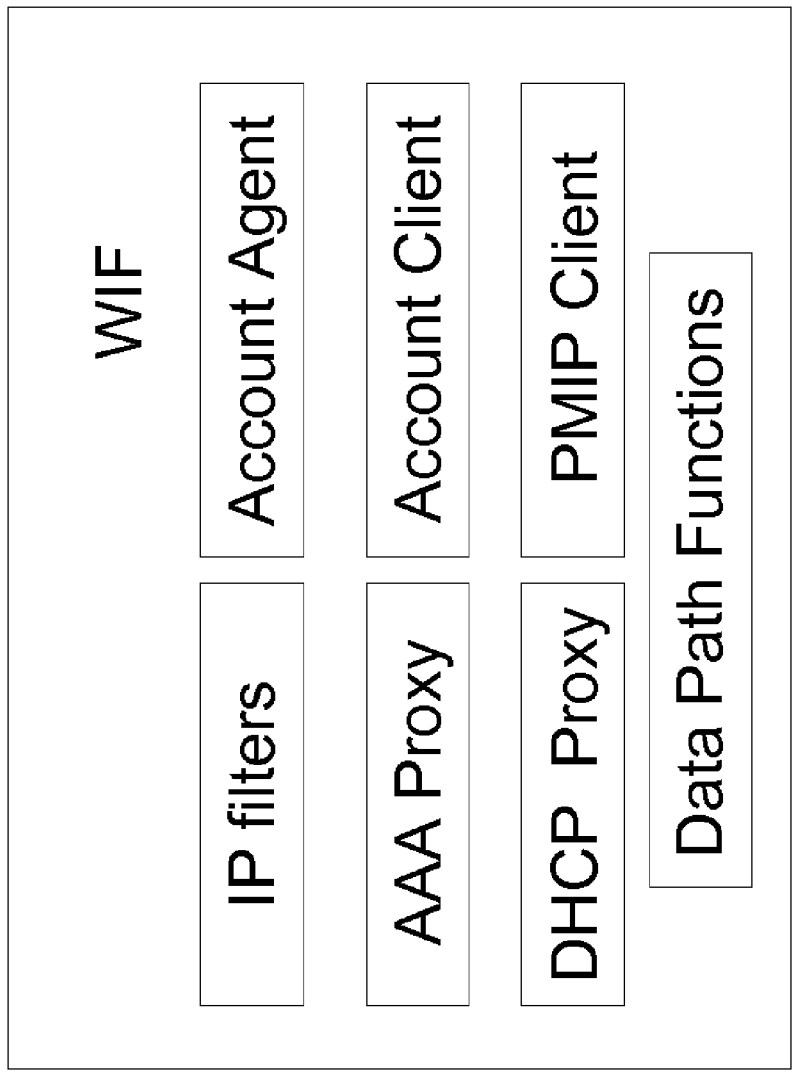
FIG. 4 illustrates a functional description of WiFi Interworking Function according to an exemplary embodiment of the disclosure.

The IWK functions group 308 may include a WiMAX signal forwarding function (WiMAX SFF) 320 used to support single radio handovers from the WiFi network to the WiMAX network, a WiFi signal forwarding function (WiFi SFF) 322 used to support single radio handovers from the WiMAX network to the WiFi network, and a WiFi interworking function (WIF) 324. The WiMAX SFF 320, the WiFi SFF 322 and the WIF 324 may be physically located in a single unit or separately located in the network depending on various applications. The WIF 324 enables the MS 302 connected to the WiFi AN 306 to access the core functionality of the CSN 310. The WIF 324 may support following functions as illustrated in FIG. 4: IP filters may restrict the access of unauthorized WiFi mobile stations. AAA Proxy may provide support for authentication and authorization using the AAA server in the CSN 310. Dynamic host configuration protocol (DHCP) proxy may serve the DHCP Requests/Replies. Account agent may collect related accounting information. Account client may generate usage data records (UDRs) and send accounting messages to the AAA server in the CSN 310. Proxy mobile IP (PMIP) client may provide support for mobility management and IP session continuity using a home agent (HA) server or local mobility anchor (LMA) server in the CSN 310. Data path functions may create Layer 3 tunnel such as IP-in-IP tunnel or generic route encapsulation (GRE) tunnel.

The CSN 310, or core network, providing IP connectivity and IP core network functions at the core of the network, may include the AAA server 326 and an HA/LMA server 328. In some instances, the authentication messages may be sent to one of the authenticators in the network (e.g., the WiMAX authenticator or the WiFi authenticator), such as using EAP methods based on the privacy and key management version 2 (PKMv2) protocol. The encapsulated messages may then be sent to the core authenticator (e.g., the AAA server 326 in FIG. 3), such as using Remote Authentication Dial-In User Service (RADIUS) protocol.

In addition to the components, FIG. 3 also illustrates a number of interfaces, called reference points, between the components. These interfaces may carry control and management protocols in support of a number of functions such as mobility management capabilities, security and performance of the communications system. Some of the reference points illustrated FIG. 3 are defined in the IEEE 802.16 standard. For example, reference point R1 is a radio interface between the MS 302 and the WiMAX ASN 304, reference point R2 between the MS 302 and the CSN 310 may support AAA, IP configuration and motility management capabilities, and reference point R3 between the WiMAX ASN 304 and the CSN 310 may support policy enforcement and motility management capabilities, and reference point R4 between the ASNs 304 may support mobility management. Also, for example, reference point R6 may support IP tunnel management to establish and release a MS connection between the BS 312 and the ASN-GW 314, and a MS connection between the WiMAX SFF 320 and the ASN-GW 314 where the WiMAX SFF 320 acts as a virtual base station.

The interworking architecture further includes a number of interworking interfaces, such as reference point R3+ between the WIF 324 and the CSN 310 to support similar functionality as the reference point R3. Reference point Rx between the MS 302 and the WiMAX SFF 320 may enable single radio handover from the WiFi network to the WiMAX network, and reference point Ry between the MS 302 and the WiFi SFF 322 may enable single radio handover from the WiMAX network to the WiFi network. Reference point W1 between the WiFi SFF 322 and the WiFi AN 306 may support handover from the WiMAX network to the WiFi network, and reference point W3 between the WIF 324 and the WiFi AN 306 may support security connection and mobility management.

Figure 5:
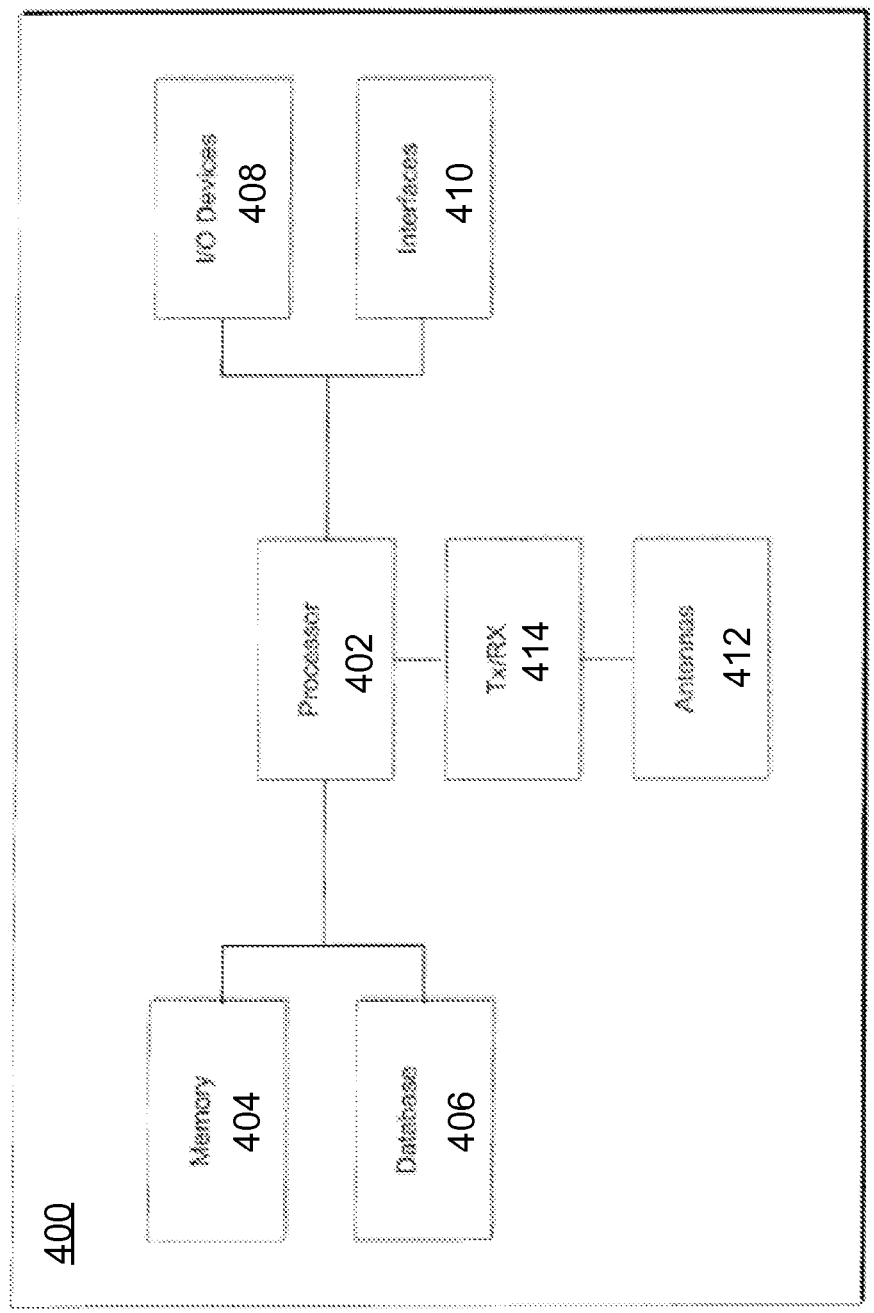
FIG. 5 is a schematic block diagram of an apparatus configured to operate as one or more of the components of the architecture of FIG. 3, in accordance with exemplary embodiments of the disclosure.

FIG. 5 illustrates a block diagram of an apparatus 400 that may be configured to operate as one or more of the components of the architecture of FIG. 3, in accordance with exemplary embodiments of the disclosure. As shown in FIG. 5, apparatus may include one or more of the following components: at least one processor 402 configured to execute computer readable instructions to perform various processes and methods, memory 404 configured to access and store information and computer readable instructions, database 406 to store tables, lists, or other data structures, I/O devices 408, interfaces 410, antennas 412 and transceivers 414.

The processor 402 may include a general purpose processor, application specific integrated circuit (ASIC), embedded processor, field programmable gate array (FPGA), microcontroller, or other like device. The Processor may be configured to act upon instructions and data to process data output from transceiver 414, I/O devices 408, interfaces 410 or other components that are coupled to processor. In some exemplary embodiments, the processor may be configured to exchange data or commands with the memory 404. For example, the processor may be configured to receive computer readable instructions from the memory and perform one or more functions under direction of the respective instructions.

The memory 404 may include a volatile or non-volatile computer-readable storage medium configured to store data as well as software, such as in the form of computer readable instructions. More particularly, for example, the memory may include volatile or non-volatile semiconductor memory devices, magnetic storage, optical storage or the like. The memory may be distributed. That is, portions of the memory may be removable or non-removable. In this regard, other examples of suitable memory include Compact Flash cards (CF cards), Secure Digital cards (SD cards), Multi-Media cards (MMC cards) or Memory Stick cards (MS cards) or the like. In some exemplary embodiments, the memory may be implemented in a network (not shown) configured to communicate with the apparatus 400.

The database 406 may include a structured collection of tables, lists or other data structures. For example, the database may be a database management system (DBMS), a relational database management system, an object-oriented database management system or similar database system. As such, the structure may be organized as a relational database or an object-oriented database. In other exemplary embodiments, the database may be a hardware system including physical computer-readable storage media and input and/or output devices configured to receive and provide access to tables, lists, or other data structures. Further, hardware system database may include one or more processors and/or displays.

The I/O devices 408 include any one or more of a mouse, stylus, keyboard, audio input/output device, imaging device, printing device, display device, sensor, wireless transceiver or other similar device. The I/O devices may also include devices that provide data and instructions to the memory 404 and/or processor 402.

The interfaces 410 may include external interface ports, such as USB, Ethernet, FireWire®, and wireless communication protocols. The interfaces may also include a graphical user interface, or other humanly perceivable interfaces configured to present data, including but not limited to, a portable media device, traditional mobile phone, smart phone, navigation device, or other computing device. The apparatus 400 may be operatively connected to a network (not shown) via a wired and/or wireless communications link using the interface.

The transceiver 414 may include any appropriate type of transmitter and receiver to transmit and receive voice and/or data from other apparatuses. In some exemplary embodiments, the transceiver may include one or a combination of desired functional component(s) and processor(s) to encode/decode, modulate/demodulate and/or perform other wireless communication-channel-related functions. The transceiver may be configured to communicate with an antenna 412 (e.g., single antenna or antenna array) to transmit and receive voice and/or data in one of various transmission modes.

Each of FIGS. 6-9 illustrates a handover procedure from a WiMAX network to a WiFi network according to an exemplary embodiment of the present disclosure. The handover procedures illustrated in FIGS. 6-9 are explained with reference to FIG. 3. As illustrated in FIGS. 6-9, a MS may be initially connected to the WiMAX network at step S502. For initial entry into the WiMAX network, the MS may use a BS (e.g., the BS 312 in FIG. 3) to attach itself to the WiMAX network through the WiMAX authenticator (e.g., the ASN-GW 314 in FIG. 3) in the access service network (e.g., the ASN 304 in FIG. 3) in this exemplary embodiment.

After the MS is attached to the WiMAX network, the WiMAX authenticator may act as a foreign agent and authenticate the MS and its user such as in accordance with an EAP-specific method (EAP-TTLS, EAP-TLS, or EAP-AKA). During the authentication procedure, the MS may provide a MS identity (MSID), e.g., network access identifier (NAI), to identify itself to the core authenticator (e.g., the AAA server 326 in FIG. 3). As a result of the authentication, a MSK (referred to as a WiMAX MSK) may be generated from a master key and held by the MS and the core authenticator. The WiMAX authenticator may obtain the WiMAX MSK such as by sending a RADIUS Access-Request message to the AAA server in the home CSN. A first PMK (referred to as a WiMAX PMK) may be derived from the MSK such as by truncating the WiMAX MSK to 160 bits. Then a number of lower encryption level keys, such as authorization key (AK) and traffic encryption key (TEK), may be derived from the WiMAX PMK at the MS and the WiMAX authenticator to support secure communication between the MS and the WiMAX BS.

At step S504, the MS may detect signals of a neighboring WiFi network and determine the presence of the WiFi network from the respective signals.

When the MS operates in a single radio mode, the MS may discover the address of a WiFi SFF (e.g, the WiFi SFF 322 in FIG. 3) and establish an IP tunnel to the WiFi SFF over the reference point Ry. A handover authentication procedure may then be performed over the IP tunnel. In the handover authentication procedure, the MS may associate with the WiFi authenticator (e.g., the AP 316, the AC 318 in FIG. 3) via the WiFi SFF over the reference point W1, such as by sending an Association Request message to the WiFi authenticator at step S506 and receiving an Association Response message at step S508 in response to the Association Request message. If the WiFi authenticator identifies the MS as a known user, the WiFi interface may be powered on and the WiMAX interface may be closed or may go into idle mode.

When the MS operates in a dual radio mode, the MS may not connect the authenticators such as the WiFi authenticator via the WiFi SFF. Instead, an IP tunnel may be directly established between the MS and the WiFi authenticator independent of (without going through) the WiFi SFF.

To reduce the handover latency, a shared key-based authentication procedure may be used instead of a full authentication procedure in the handover authentication procedure. Since one of the authenticators (e.g., the WiMAX authenticator or the core authenticator) may have the same MSK as the MS has, due to the full authentication executed in the connectivity to the WiMAX network, the WiMAX MSK may be re-used to generate a second PMK (referred to as a WiFi PMK) such as by truncating the WiMAX MSK to 256 bits. A number of lower level encryption keys such as pairwise transient key (PTK) and group transient key (GTP), may be subsequently derived from the second PMK (i.e., the WiFi PMK) to support secure communication over the WiFi network. In this manner, generation of a second MSK and the subsequent MSK exchange may be avoided.

Through the Association Request/Response at step S506 and step S508, the MS and the WiFi authenticator may verify the existence of a common PMK. In other words, the MS and the WiFi authenticator may verify if they have the same WiFi PMK, such as by comparison of an identifier of the WiFi PMK (e.g., WiFi PMKID). Since the WiFi PMK may be derived from the earlier generated WiMAX MSK, the authentication time may be significantly reduced. The WiFi authenticator may or may not recognize the WiFi PMKID. In either situation, the WiFi authenticator may request that the MS provide its identity at step S510 and receive an Identity Response message with the MS identity (MSID) at step S512.

Figure 6:
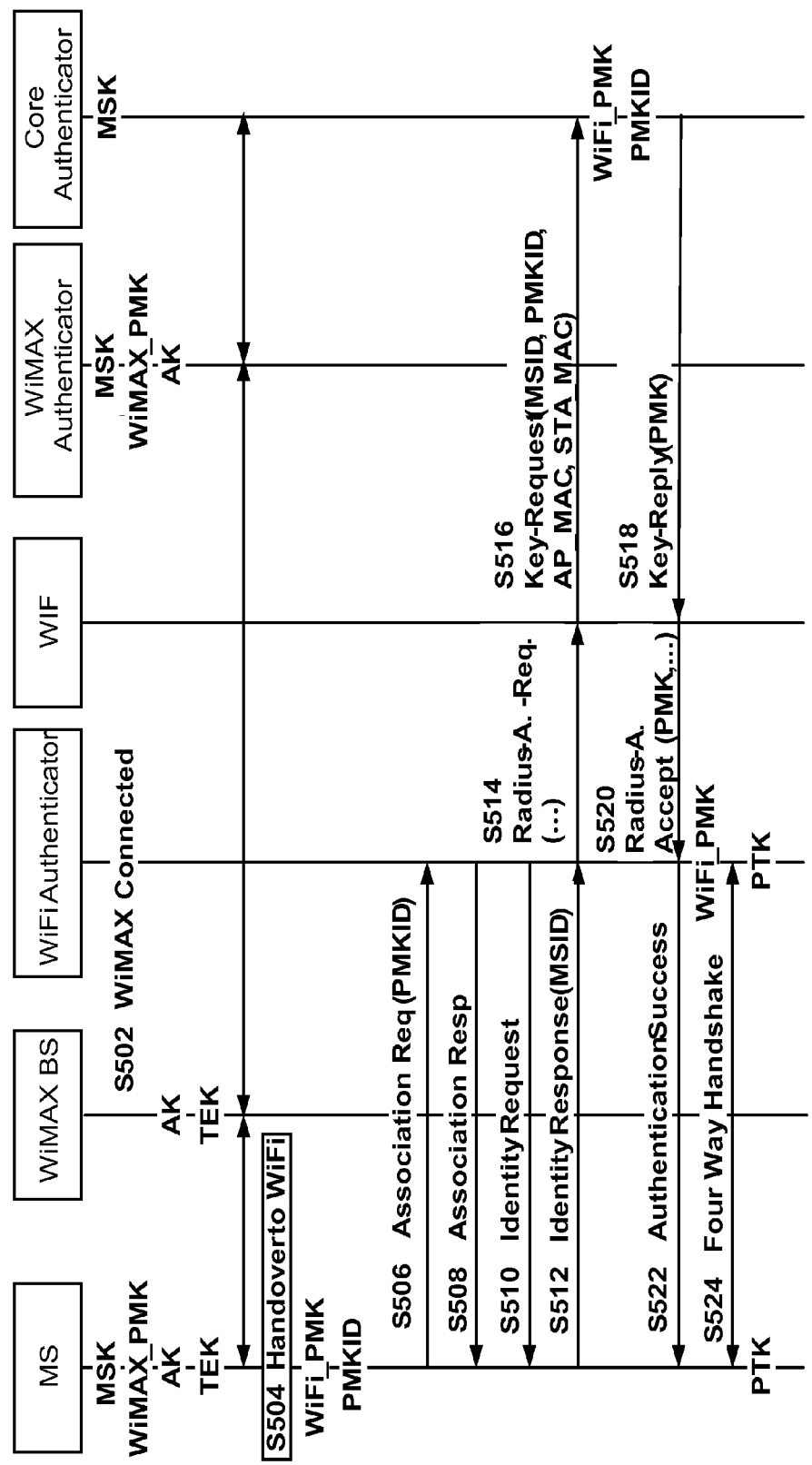
FIGS. 6-9 illustrate a handover procedure from a WiMAX network to a WiFi network according to various exemplary embodiments of the disclosure.
Figure 7:
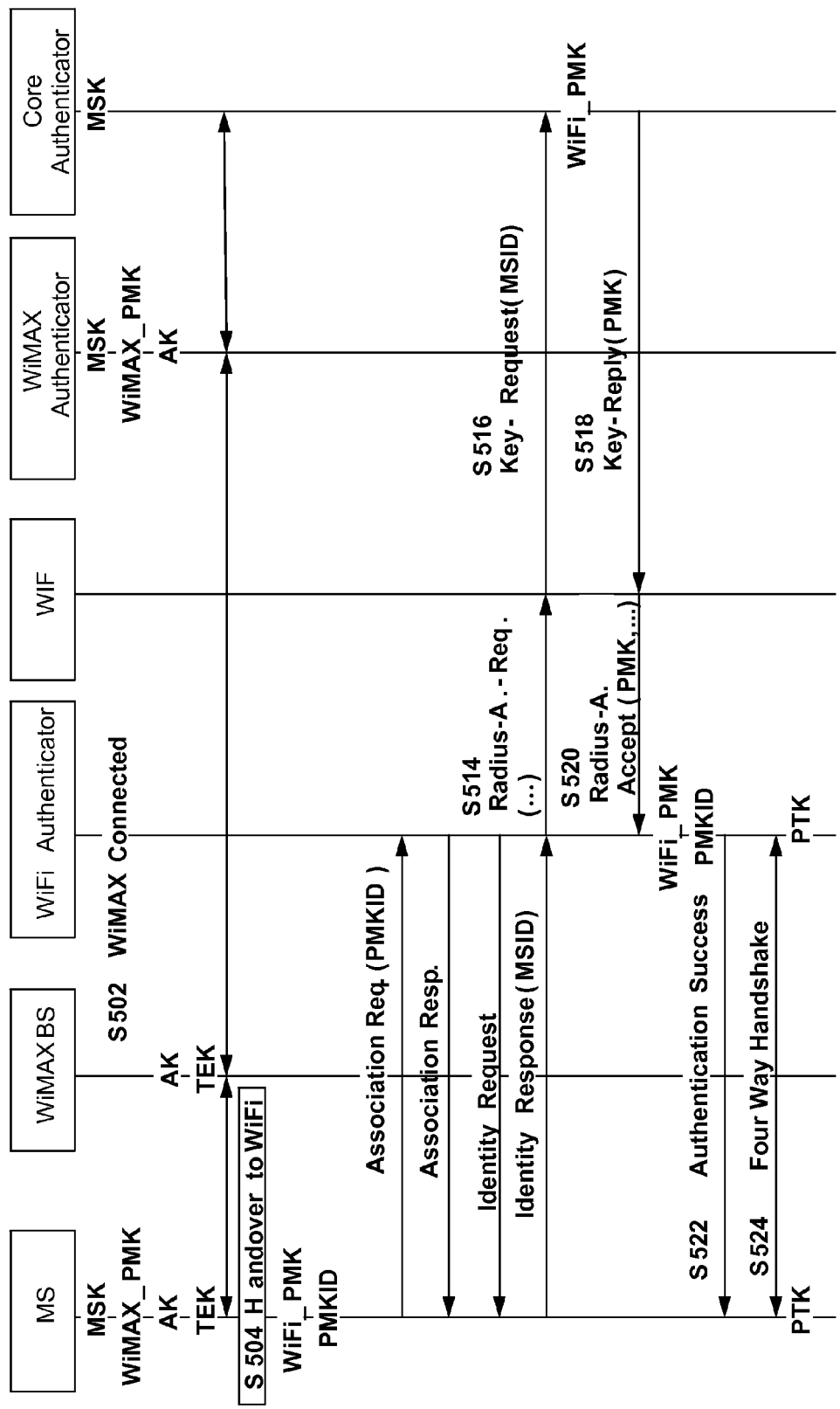
Figure 8:
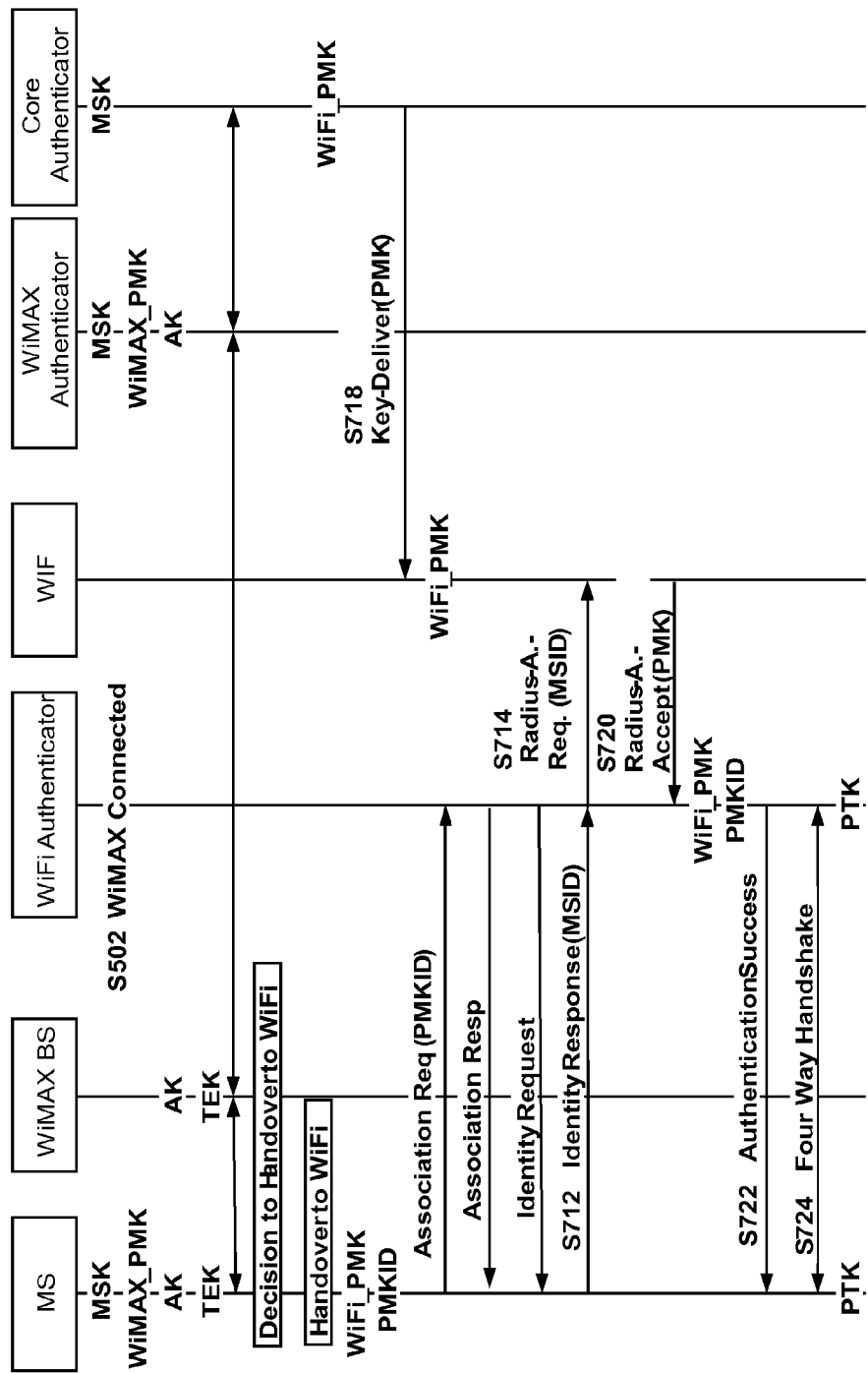

In some instances, the core network may not know the target AN or target WIF to which the MS intends to roam, as illustrated in FIGS. 6 and 7. In these exemplary embodiments, the WiFi authenticator may place information associated with the MSID into an Access Request message, and send the Access Request message at step S514 toward a WIF over the reference point W3, such as according to the RADIUS protocol. The WIF may act as an authentication server proxy to provide support for authorization and authentication. The WIF may forward the MSID and/or the WiFi PMKID within a Key Request message at step S516.

In one instance the WiFI PMKID may be provided to one of the authenticators (e.g., the core authenticator or the WiMAX authenticator) along with the media access control (MAC) addresses of the MS and the WiFi authenticator via the WIF. The authenticator which has received the WiFi PMKID such as the core authenticator or the WiMAX authenticator may then verify whether it has the same WiFi PMK as the MS, such as by comparison of the WiFi PMKID. In the exemplary embodiment as illustrated in FIG. 6, the PMKID is provided to the core authenticator thereby being verified by the core authenticator. Upon verification, the WiFi PMK may be delivered from the core authenticator or the WiMAX authenticator to the WIF in a Key Reply Message at step S518. The WIF may forward the WiFi PMK to the WiFi authenticator in an Access Accept message, such as using the RADIUS protocol, at step S520. The handover authentication procedure based on an EAP method (e.g., EAP-TLS method or EAP-TTLS method) may then conclude with an Authentication Success message at step S522. After a four-way handshake performed between the MS and the WiFi authenticator at step S524, a PTK may be established between the MS and the WiFi authenticator for protecting the subsequent data transmissions.

In another exemplary embodiment in which the core network does not know the target AN or target WIF, as shown in FIG. 7, the WIF may only provide the MSID to one of the authenticators (e.g., the core authenticator or the WiMAX authenticator) at step S516. In this case, by verification of the MSID, one of the authenticators such as the core authenticator or the WiMAX authenticator may deliver the WiFi PMK to the WiFi authenticator through the WIF. In this specific embodiment, the WiFi PMK is delivered to the WiFi authenticator by the core authenticator. The WiFi authenticator, instead of the core authenticator as in FIG. 6, may verify the PMKID. If the PMKID is valid, the WiFi authenticator may send an Authentication Success message to the MS at step S522.

In some cases compared to the above exemplary embodiments, the core network may forecast the target WIF to which the MS intends to roam. In this instance, one of the authenticators, such as the core authenticator or the WiMAX authenticator, may deliver the WiFi PMK directly to the target WIF at step S718. In the exemplary embodiment illustrated in FIG. 8, WiFi PMK is delivered to the target WIF by the core authenticator. Similar to the exemplary embodiments illustrated in FIGS. 6 and 7, in response to an Identity Request message, the MS may send an Identity Response message including the MSID to such as a WiFi authenticator at step S712. The WiFi authenticator may forward the MSID to the target WIF in an Access Request Message at step S714. Upon verification of the MSID by the target WiFi, the WiFi PMK may then be delivered to the WiFi authenticator in an Access Accept message at step S720. The WiFi authenticator may verify the WiFi PMKID before it sends an Authentication Success message to the MS at step S722. The MS may then execute a four-way handshake at step S724, and may establish a PTK between the MS and the WiFi authenticator for protecting the subsequent data transmissions.

Figure 9:
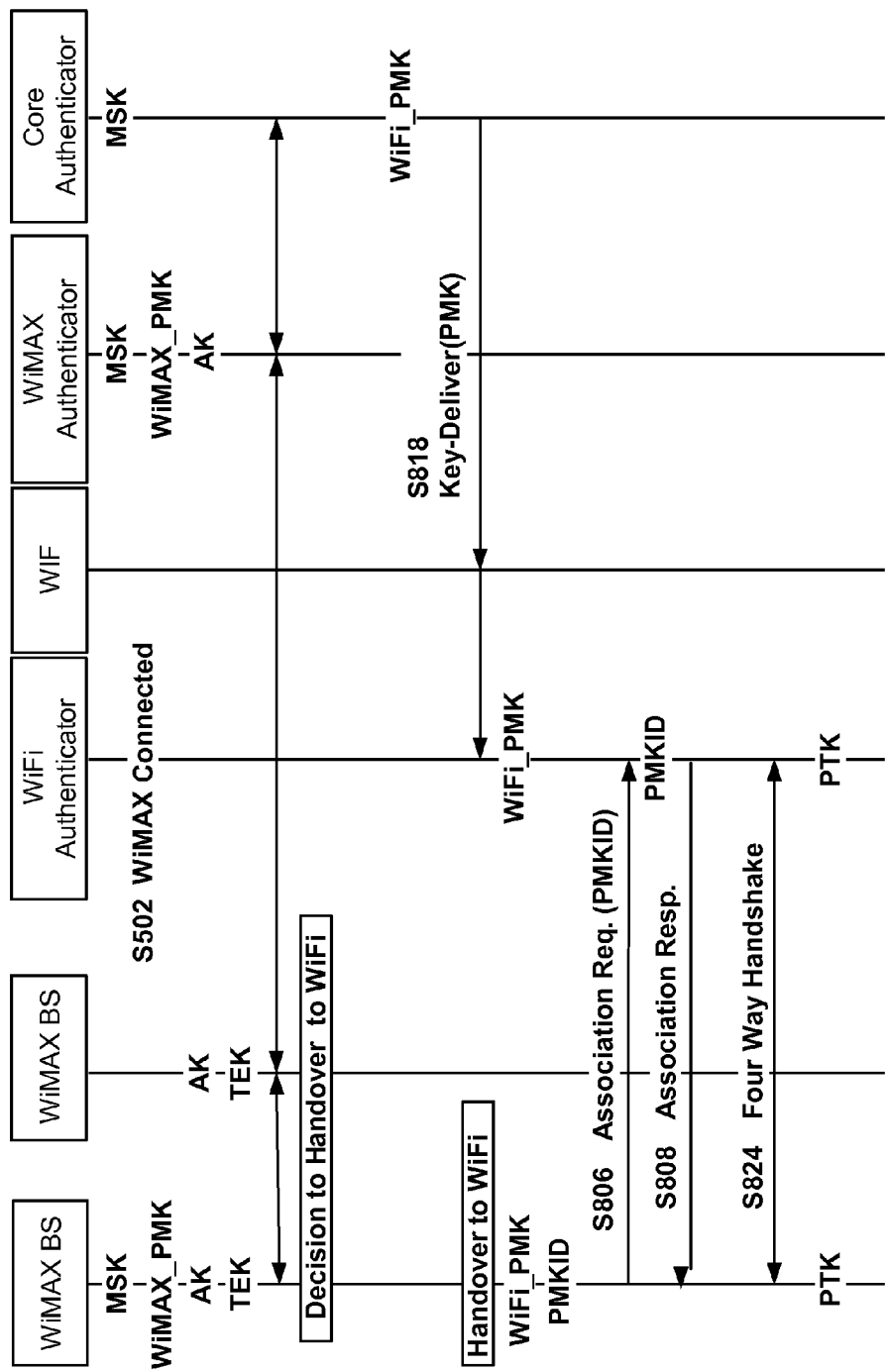

FIG. 9 illustrates another exemplary embodiment in which the Core Network may forecast the target WiFi authenticator to which the MS may roam. Since the core network knows the target, the WiFi PMK may be directly delivered to the target WiFi authenticator from the WiMAX authenticator or the core authenticator depending on various applications, through the WIF at step S818. The MS may send the WiFi PMKID in an Association Request message at step S806, and may receive an Association Response message at step S808 to verify with the target WiFi authenticator whether they have the same WiFi PMK by the WiFi PMKID. The MS and the target WiFi authenticator may then execute a four-way handshake at step S824, and may generate a PTK for protecting the subsequent data transmissions between the MS and the target WiFi authenticator.

Each of FIGS. 10-13 illustrates a handover procedure from a WiFi network to a WiMAX network according to an exemplary embodiment of the present disclosure. Before a MS handovers from the WiFi network to the WiMAX network, the MS initially connects to the WiFi network at step S902. In connecting to the WiFi network, the MS may establish associations with WiFi Access Network and authenticate with one of the authenticators using various authentication procedures, such as an EAP authentication procedure or a pre-shared key (PSK) authentication procedure. In this exemplary embodiment, the authenticator may be a core authenticator (such as the AAA server 326 in FIG. 3) or a WiFi authenticator (such as the AP 326 or AC 328 in FIG. 3). The WiFi Access Network may select a WIF (e.g., the WIF 324 in FIG. 3) based on a MSID, e.g., a NAI, to assist the authentication procedure between the core authenticator and the MS. As the result of a successful authentication procedure, a MSK (referred to as a WiFi MSK) may be generated and held by the MS and the core authenticator. A WiFi PMK may then be derived from the WiFi MSK. A number of WiFi encryption keys, such as PTK and GTK, are subsequently derived from the WiFi PMK to support secure communication over the WiFi network.

At step S904, the MS may detect signals of the neighboring WiMAX network and determine the presence of the WiMAX network from the respective signals.

When the MS operates in a single radio mode, the MS may discover the address of a WiMAX SFF (e.g., the WiMAX SFF 320 in FIG. 3) and establish a tunnel to the WiMAX SFF over the reference point Rx. In this instance, the WiMAX SFF may act as a virtual BS. A handover authentication procedure to authenticate the MS with one of the authenticators such as a WiMAX authenticator (e.g., the WiMAX ASN-GW 314 in FIG. 3) may then be executed via the WiMAX SFF. If the WiMAX authenticator identifies the MS, the WiFi interface may be powered on and the WiFi interface may be closed or may go into idle mode.

When the MS operates in a dual radio mode the MS may stop connectivity with the WiFi network and engage to the WiMAX authenticator independent of the WiMAX SFF. In order to reduce the handover latency, a shared key-based authentication procedure may be used instead of a full authentication procedure in the handover authentication procedure. The WiFi MSK may be re-used to generate a WiMAX PMK such as by truncating the WiFi MSK to 160 bits, which may be used to derive a number of lower level encryption keys to support secure communication over the WiMAX network. Accordingly, generation of a second MSK and the subsequent MSK exchange may be avoided.

Figure 10:
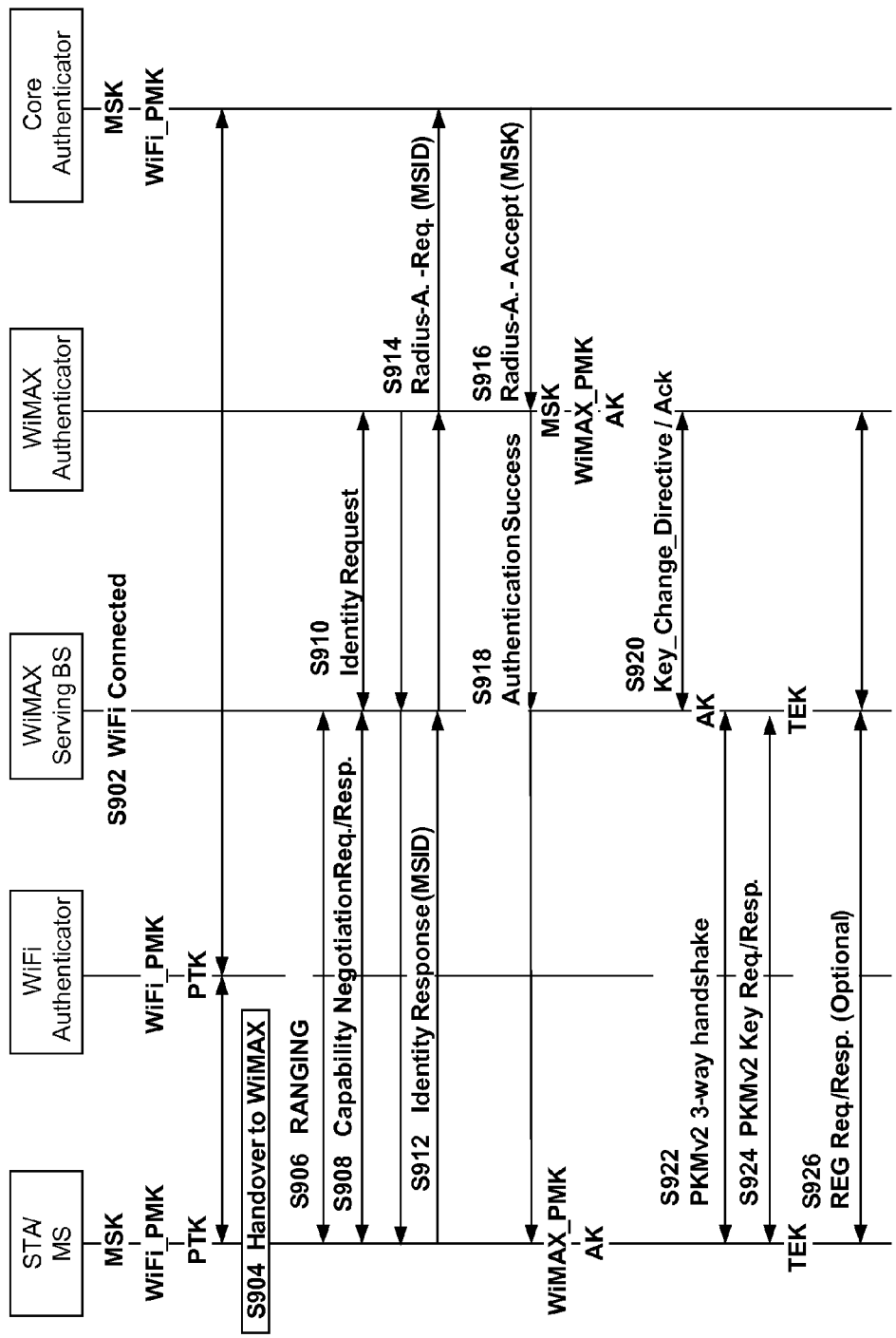
FIGS. 10-13 illustrate a handover procedure from a WiFi network to a WiMAX network according to various exemplary embodiments of the disclosure.
Figure 11:
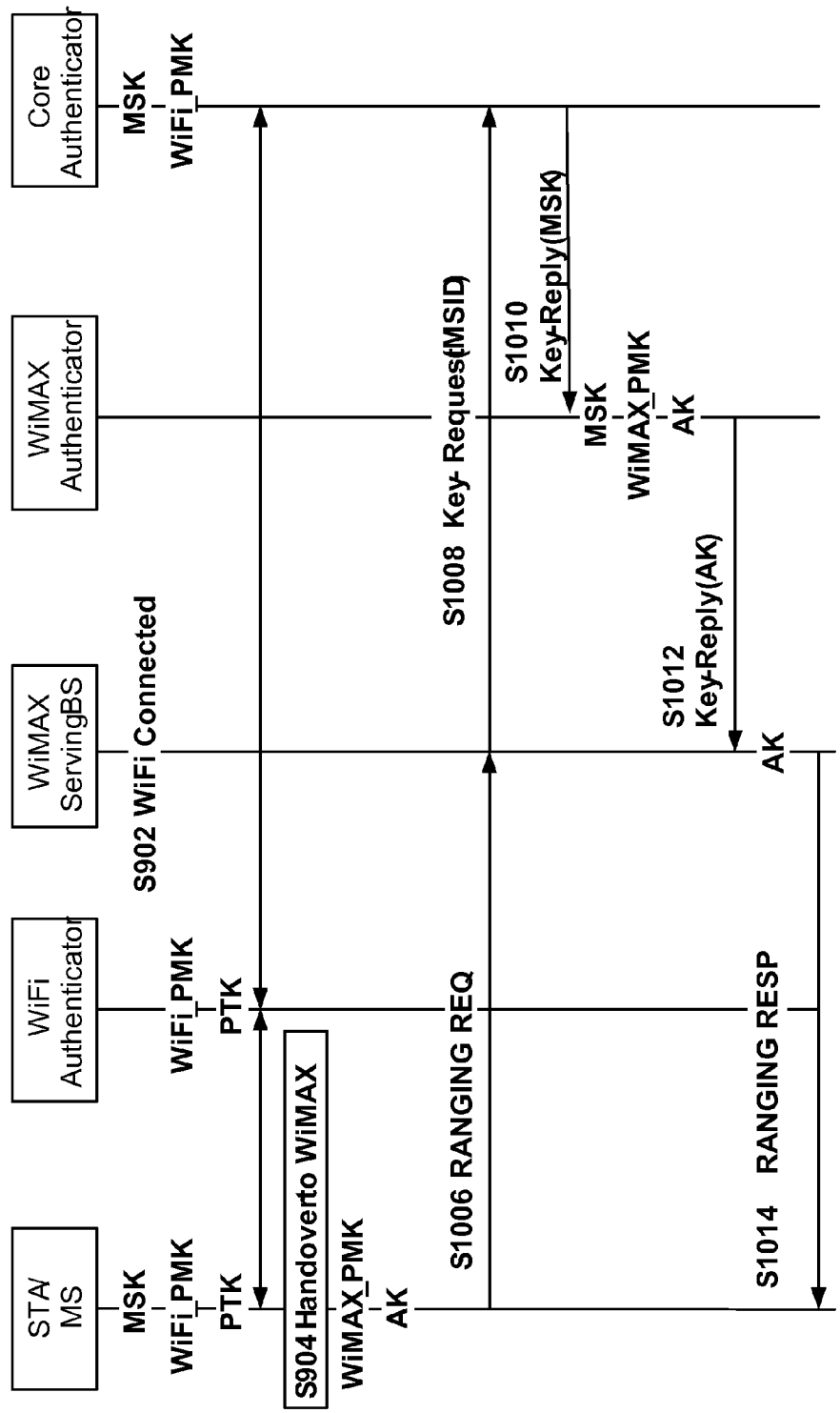

In exemplary embodiments illustrated in FIG. 10 and FIG. 11, the core network may not forecast target WiMAX BS or target WiMAX ASN-GW to which the MS intends to roam. Referring to FIG. 10, a Ranging Request/Response may be exchanged between the MS and a WiMAX serving BS at step S906. In the process of ranging, the MS may acquire the appropriate timing offsets, correct its frequency offsets and adjust its transmission power. Upon successful completion of ranging, capability negotiation may be executed between the MS and the serving BS at step S908. During capability negotiation, modulation schemes, the privacy and key management (PKM) version, and authorization policy may be negotiated.

Handover authentication between the MS and one of the authenticators such as the core authenticator, and the exchange of encryption keys may occur as follows. In the handover authentication procedure, in response to an Identity Request message at step S910, the MS may provide its MSID to identify and authenticate itself to one of the authenticators such as the WiMAX authenticator at step S912. The WiMAX authenticator may encrypt the MSID, such as according to the RADIUS protocol, and may forward the encrypted message to the core authenticator. Once the core authenticator verifies the MSID, the WiFi MSK may be delivered to the WiMAX authenticator at step S916 by the core authenticator or the WiFi authenticator.

The handover authentication procedure may conclude by sending an Authentication Success message to the MS at step S918. A WiMAX PMK and an AK may be subsequently derived from the WiFi MSK at the WiMAX authenticator and the MS. After the AK is passed from the WiMAX authenticator to a serving BS at step S920 a three-way handshake may be performed at step S922, such as using the PKMv2 protocol, to confirm that the MS and the serving BS have an identical AK, and to establish a data security association between the MS and the serving BS. The security association may contain security information shared between the serving BS and the MS to support secure communication across the WiMAX network. Key Request/Response messages may be exchanged (e.g., using PKMv2 protocol) at step S924 between the MS and the serving BS to thereby exchange a TEK—which itself may be derived from the AK. The TEK may be used to encrypt data transmissions. Optionally, the serving BS may reply with a Registration Response message in response to a Registration Request message sent from the MS to complete the capability negotiation at step S926.

The handover procedure illustrated in FIG. 10 may cause a short interruption time before new connections are established with the serving BS. In order to optimize the network entry procedure, the message exchange can be shortened. To do so, one or several of the network entry steps may be skipped. For example, the capabilities negotiation, PKM, authentication procedure and/or encryption key establishment may be skipped. In some instances, as an exemplary embodiment illustrated in FIG. 11, the serving BS and the MS may not exchange any network entry messages after the Ranging Request message is sent to the serving BS at step S1006. Because the core network may not be capable of forecasting the target BS or target WiMAX authenticator to which the MS intends to roam, the serving BS may send the MSID in a Key Request message to the core authenticator at step S1008. Upon verification of the MSID, one of the authenticators (e.g., the core authenticator or the WiFi authenticator) may send the WiFi MSK to the WiMAX authenticator in a Key Replay message at step S1010. The WiMAX PMK may be derived from the WiFi MSK by truncating the WiFi MSK to 160 bits. A number of lower encryption keys such as an AK and a TEK may be subsequently derived from the WiMAX PMK at the WiMAX authenticator. The AK may be passed to the serving BS by the WiMAX authenticator at step S1012. The serving BS may respond to the MS with a Ranging Response message at step S1014 to complete the handover procedure.

Figure 12:
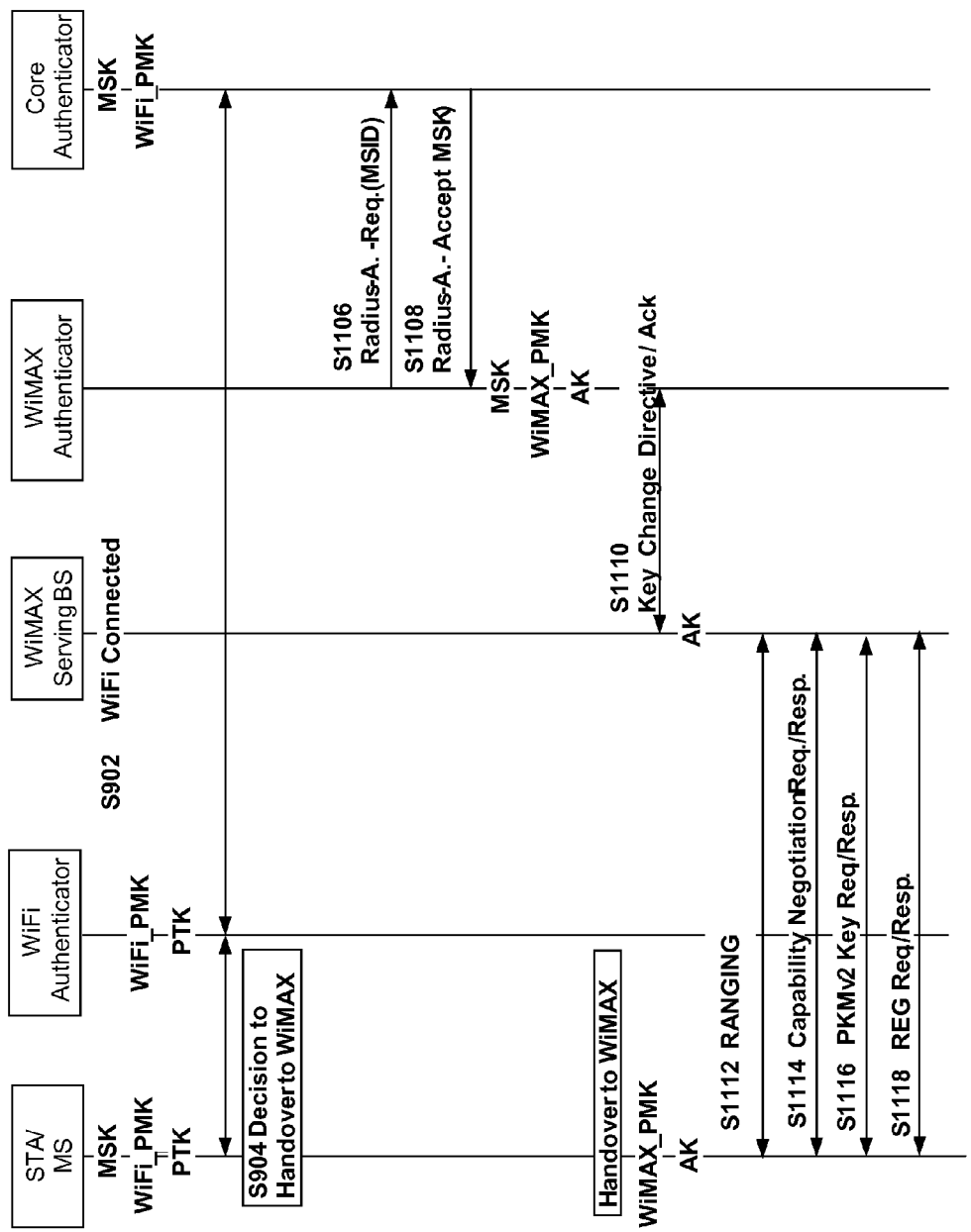
Figure 13:
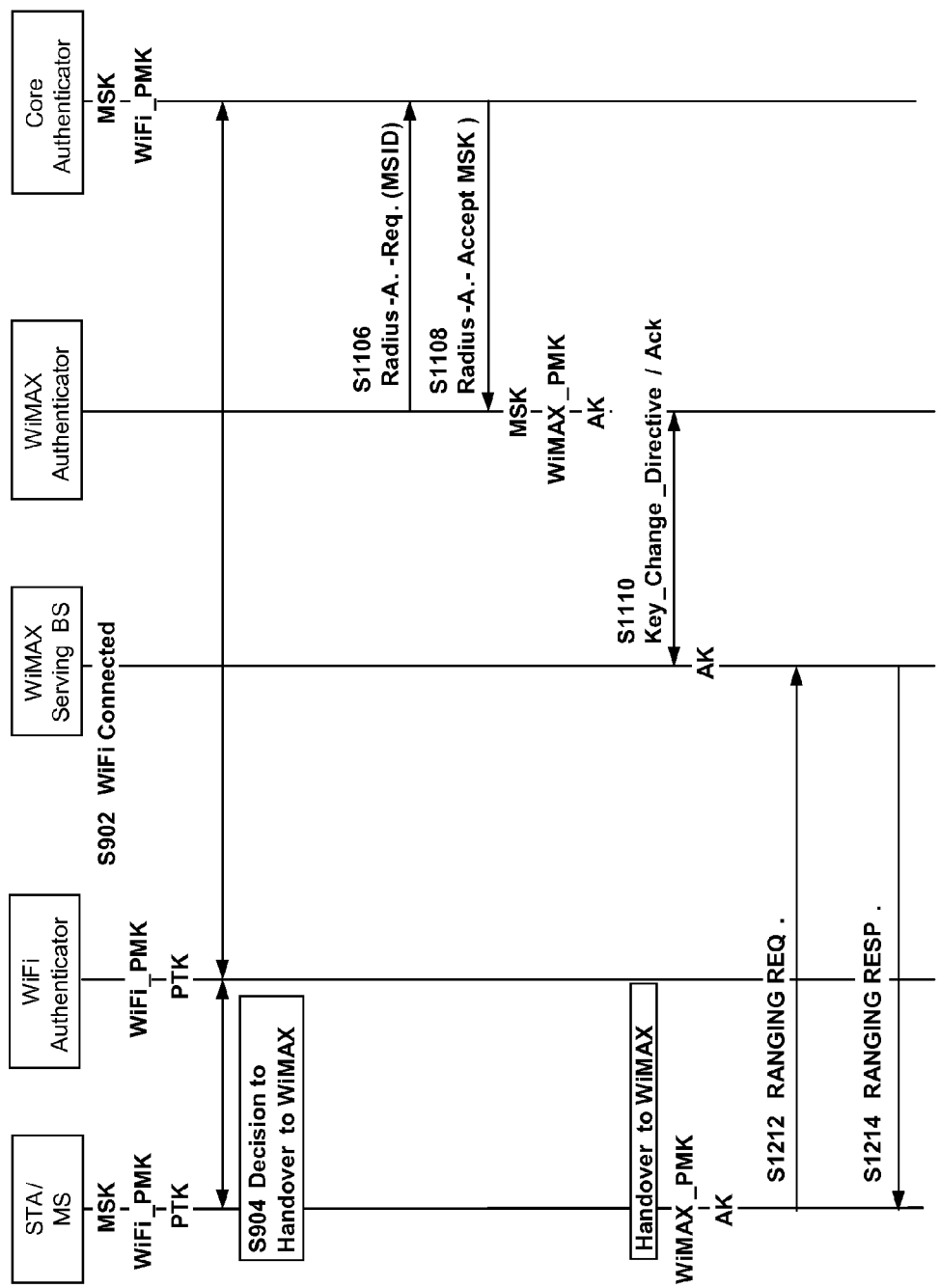

In some instances the core network may know target BS or target WiMAX authenticator to which the MS intends to roam, as illustrated in FIGS. 12 and 13, one of the authenticators such as the core authenticator or the WiFi authenticator may verify the MSID provided by the WiMAX authenticator and may deliver the WiFi MSK to the target WiMAX authenticator. In this exemplary embodiment, the MSID is verified by the core authenticator at step S1106, and in response thereto, the WiFi MSK is delivered to the target WiMAX authenticator at step S1108, such as using the RADIUS protocol. Encryption keys, such as the WiMAX PMK and the AK, may be derived from the WiFi MSK at the WiMAX authenticator. The AK may then be delivered to the target BS at step S1110.

In some instances a handover optimization method may not be adopted, as shown in FIG. 12, Ranging Request and Rang Response messages may be exchanged between the MS and the target BS at step S1112 to acquire correct timing offsets and transmission power for the MS. Upon successful completion of ranging, capability negotiation may be executed between the MS and the target BS at step S1114 to negotiate parameters such as modulation schemes, the PKM version, and authorization policy. Key Request/Response messages may be exchanged (e.g., using PKMv2 protocol) at step S1116 between the MS and the target BS to thereby exchange a TEK derived from the AK. The TEK may be used to encrypt application data. The target BS may optionally respond to a Registration Request message from the MS with a Registration Response message to complete the capability negotiation at step S1118.

A handover optimization method may be adopted in the case that the core network may forecast the target BS or the target WiMAX authenticator to which the MS intends to roam. As illustrated in FIG. 13, the message exchange may be shortened to optimize the network entry procedure. Similar to the reduced handover procedure illustrated in FIG. 11, one or several of network entry steps may be skipped. For example, negotiate basic capabilities, PKM, authentication procedure and/or encryption key establishment may be skipped. The whole network entry procedure may be skipped, such as by transferring the entire operational information to the target BS. Having exchanged the entire operational information, the target BS and the MS may not exchange any network entry message after the MS sends its Ranging Request message to the target BS at step S1212. The target BS may response to the MS with a Ranging Response message at step S1214 to complete the handover procedure.

According to one aspect of the disclosure, all or a portion of the MS, the BS, the AP, the AC, and the ASN-GW of exemplary embodiments of the disclosure, generally operate under control of a computer program. The computer program for performing the methods of exemplary embodiments of the disclosure may include one or more computer-readable program code portions, such as a series of computer instructions, embodied or otherwise stored in a computer-readable storage medium, such as the non-volatile storage medium.

FIGS. 6-13 are control flow diagrams reflecting methods, systems and computer programs according to exemplary embodiments of the disclosure. It will be understood that each block or step of the control flow diagrams, and combinations of blocks or steps in the control flow diagrams, may be implemented by various means, such as hardware alone or in combination with firmware, and/or software including one or more computer program instructions. As will be appreciated, any such computer program instructions may be loaded onto a computer or other programmable apparatus to produce a machine, such that the instructions which execute on the computer or other programmable apparatus (e.g., hardware) create means for implementing the functions specified in the block(s) or step(s) of the control flow diagrams. These computer program instructions may also be stored in a computer-readable memory that may direct a computer or other programmable apparatus to function in a particular manner, such that the instructions stored in the computer-readable memory produce an article of manufacture including instruction means which implement the function specified in the block(s) or step(s) of the control flow diagrams. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block(s) or step(s) of the control flow diagrams.

Accordingly, blocks or steps of the control flow diagrams support combinations of means for performing the specified functions, combinations of steps for performing the specified functions and program instruction means for performing the specified functions. It will also be understood that one or more blocks or steps of the control flow diagrams, and combinations of blocks or steps in the control flow diagrams, may be implemented by special purpose hardware-based computer systems which perform the specified functions or steps, or combinations of special purpose hardware and computer instructions.

It will be appreciated by those skilled in the art that changes could be made to the examples described above without departing from the broad inventive concept. It is understood, therefore, that this disclosure is not limited to the particular examples disclosed, but it is intended to cover modifications within the spirit and scope of the disclosure as defined by the appended claims. Although specific terms are employed herein, they are used in a generic and descriptive sense only and not for purposes of limitation.

What is claimed is:

1. A method for preparing for handover of an apparatus from a first wireless network to a second, different wireless network, a master session key (MSK) having been generated during establishment of a connectivity of the apparatus to the first wireless network, the method comprising:
  detecting signals of the second wireless network; and in response thereto,
  establishing a connectivity of the apparatus to the second wireless network, using a pairwise master key (PMK) derived from the MSK generated during establishment of the connectivity to the first wireless network, one or more encryption keys being derivable from the PMK to support secure communication over the second wireless network.

2. The method of claim 1, wherein the apparatus and the PMK each have a unique identifier, and wherein the method further comprises providing the identifier of the PMK to a core network authentication component in a core network via an interworking function to enable one of the core network authentication component or a first network authentication component in the first wireless network to deliver the PMK to a second network authentication component in the second wireless network by verification of the identifiers of the apparatus and the PMK, the identifier of the PMK being verified by the core network authentication component to validate the PMK.

3. The method of claim 1, wherein the apparatus and the PMK each have a unique identifier, and wherein the method further comprises providing the identifier of the apparatus to a core network authentication component in a core network via an interworking function to enable one of the core network authentication component or a first network authentication component in the first wireless network to deliver the PMK to a second network authentication component in the second wireless network by verification of the identifiers of the apparatus and the PMK, the identifier of the PMK being verified by the second network authentication component to validate the PMK.

4. The method of claim 1, further comprising accessing a network authentication component in the second wireless network via a signal forward function to power on an interface of the second wireless network.

5. The method of claim 1, further comprising providing the identifier of the apparatus to an interworking function via a network authentication component in the second wireless network to enable the interworking function to deliver the PMK to the network authentication component by verification of the identifier of the apparatus.

6. The method of claim 1, wherein the PMK has a unique identifier, and wherein the method further comprises providing the identifier of the PMK to a network authentication component in the second wireless network to enable the network authentication component to verify the identifier of the PMK upon a receipt of the PMK delivered from one of a core network authentication component in a core network or a network authentication component in the first wireless network via an interworking function.

7. The method of claim 1, further comprising accessing a network authentication component in the second wireless network via a signal forward function to power on an interface of the first wireless network.

8. The method of claim 1, wherein the apparatus has a unique identifier, and wherein the method further comprises performing an authentication procedure with a base station to verify if the base station and the apparatus have a common security key, the security key being provided by a network authentication component in the second wireless network upon verification of the identifier of the apparatus by a core network authentication component in a core network.

9. The method of claim 8, further comprising providing the identifier of the apparatus to the core network authentication component via the base station and the network authentication component to enable the core network authentication component to provide the MSK to one of the network authentication component in the first wireless network or the network authentication component in the second wireless network upon verification of the identifier of the apparatus, and to enable derivation of the PMK from the MSK in at least one of the network authentication component in the first wireless network or the network authentication component in the second wireless network.

10. The method of claim 8, wherein the identifier of the apparatus is provided by the network authentication component in the second wireless network to enable one of the core network authentication component or a network authentication component in the first wireless network to provide the MSK to the network authentication component in the second wireless network upon verification of the identifier of the apparatus, and to enable derivation of the PMK from the MSK at one of the network authentication component in the first wireless network or the network authentication component in the first wireless network.

11. An apparatus comprising a processor configured to prepare a handover for the apparatus from a first wireless network to a second, different wireless network, a master session key (MSK) have been generated during establishment of a connectivity of the apparatus to the first wireless network, the processor configured to perform or cause the apparatus to perform at least the following:
  detecting signals of the second wireless network; and in response thereto,
  establishing a connectivity of the apparatus to the second wireless network, using a pairwise master key (PMK) derived from the MSK generated during establishment of the connectivity of the apparatus to the first wireless network, one or more encryption keys being derivable from the PMK to support secure communication over the second wireless network.

12. The apparatus of claim 11, wherein the apparatus and the PMK each have a unique identifier, and wherein the method further comprises providing the identifier of the PMK to a core network authentication component in a core network via an interworking function to enable one of the core network authentication component or a first network authentication component in the first wireless network to deliver the PMK to a second network authentication component in the second wireless network by verification of the identifiers of the apparatus and the PMK, the identifier of the PMK being verified by the core network authentication component to validate the PMK.

13. The apparatus of claim 11, wherein the apparatus and the PMK each have a unique identifier, and wherein the method further comprises providing the identifier of the apparatus to a core network authentication component in a core network via an interworking function to enable one of the core network authentication component or a first network authentication component in the first wireless network to deliver the PMK to a second network authentication component in the second wireless network by verification of the identifiers of the apparatus and the PMK, the identifier of the PMK being verified by the second network authentication component to validate the PMK.

14. The apparatus of claim 11, further comprising accessing a network authentication component in the second wireless network via a signal forward function to power on an interface of the second wireless network.

15. The apparatus of claim 11, further comprising providing the identifier of the apparatus to an interworking function via a network authentication component in the second wireless network to enable the interworking function to deliver the PMK to the network authentication component by verification of the identifier of the apparatus.

16. The apparatus of claim 11, further comprising providing the identifier of the PMK to a network authentication component in the second wireless network to enable the network authentication component to verify the identifier of the PMK upon a receipt of the PMK delivered from one of a network authentication component in a core network or a network authentication component in the first wireless network via an interworking function.

17. The apparatus of claim 11, further comprising accessing a network authentication component in the second wireless network via a signal forward function to power on an interface of the first wireless network.

18. The apparatus of claim 11, wherein the apparatus has a unique identifier, and wherein the method further comprises performing an authentication procedure with a base station to verify if the base station and the apparatus have a common security key, the security key being provided by a network authentication component in the second wireless network upon verification of the identifier of the apparatus by a core network authentication component in a core network.

19. The apparatus of claim 18, further comprising providing the identifier of the apparatus to the core network authentication component via the base station and the network authentication component to enable the core network authentication component to provide the MSK to one of a network authentication component in the first wireless network or the network authentication component in the second wireless network upon verification of the identifier of the apparatus, and to enable derivation of the PMK from the MSK in at least one of the network authentication component in the first wireless network or the network authentication component in the second wireless network.

20. The apparatus of claim 18, wherein the identifier of the apparatus is provided by the network authentication component to enable the core network authentication component to provide the MSK to one of a network authentication component in the first wireless network or the network authentication component in the second wireless network upon verification of the identifier of the apparatus, and to enable derivation of the PMK from the MSK in at least one of the network authentication component in the first wireless network or the network authentication component in the second wireless network.

21. A method for preparing a handover of an apparatus from a first wireless network to a second, different wireless network, the method comprising establishing a connectivity of the apparatus to the second wireless network, using a pairwise master key (PMK) derived from a master session key (MSK) generated during establishment of a connectivity of the apparatus to the first wireless network, one or more encryption keys being derivable from the PMK to support secure communication over the second wireless network.

* * * * *